US007980931B1

(12) United States Patent
Krane et al.

(10) Patent No.: US 7,980,931 B1
(45) Date of Patent: Jul. 19, 2011

(54) SOCIAL NETWORKING METHODS USING COLOR PAIR PERSONALITY PROFILES

(76) Inventors: Leonard Krane, Los Angeles, CA (US); Ila Krane, Los Angeles, CA (US)

( * ) Notice: Subject to any disclaimer, the term of this patent is extended or adjusted under 35 U.S.C. 154(b) by 0 days.

(21) Appl. No.: 12/749,258

(22) Filed: Mar. 29, 2010

(51) Int. Cl.
*A63F 13/00* (2006.01)
(52) U.S. Cl. ............ 463/9; 434/236; 434/237; 434/238
(58) Field of Classification Search ...... 463/9; 434/322, 434/236–238; 273/429
See application file for complete search history.

(56) References Cited

U.S. PATENT DOCUMENTS

| | | | |
|---|---|---|---|
| 4,682,956 A | 7/1987 | Krane | |
| 4,815,976 A | 3/1989 | Krane | |
| 4,971,561 A | 11/1990 | Krane | |
| 5,542,849 A * | 8/1996 | Douglass | 434/236 |
| 5,696,981 A * | 12/1997 | Shovers | 704/10 |
| 5,702,253 A * | 12/1997 | Bryce et al. | 434/236 |
| 5,938,531 A * | 8/1999 | Yasushi et al. | 463/36 |
| 5,954,581 A * | 9/1999 | Ohta et al. | 463/9 |
| 6,290,602 B1 * | 9/2001 | Kawano | 463/23 |
| 6,685,479 B1 * | 2/2004 | Ghaly | 434/236 |
| 6,863,534 B1 | 3/2005 | Sadka | |
| 6,893,265 B2 * | 5/2005 | Sadka | 434/236 |
| 2002/0045154 A1 * | 4/2002 | Wood et al. | 434/350 |
| 2004/0076936 A1 * | 4/2004 | Horvitz et al. | 434/236 |
| 2006/0073451 A1 * | 4/2006 | Thornley | 434/236 |
| 2008/0133716 A1 * | 6/2008 | Rao et al. | 709/220 |
| 2009/0054123 A1 * | 2/2009 | Mityagin et al. | 463/9 |
| 2009/0191524 A1 * | 7/2009 | Kim | 434/236 |
| 2009/0264173 A1 * | 10/2009 | Zois et al. | 463/9 |

OTHER PUBLICATIONS

Game Manual for "Trivial Pursuit Unhinged" for the Xbox platform, published on or before Dec. 31, 2004 and retreived from http://www.replacementdocs.com/request.php?1781.*
Dr. Max Luscher(Translated by Ian A. Scott), The Luscher Color Test, 1969, Pocket Books, New York, NY.

* cited by examiner

*Primary Examiner* — Dmitry Suhol
*Assistant Examiner* — Jason Skaarup
(74) *Attorney, Agent, or Firm* — Wagner, Anderson & Bright, P.C.; Roy L Anderson

(57) ABSTRACT

Methods are implemented in a computer system with one or more processors configured to execute one or more computer program modules in which one or more computer program modules configured to communicate with electronic storage media that stores a set of at least six colors and questions having multiple answers, one of which is a predicted answer, individual questions and their predicted answers being based at least in part on unique color pair personality profiles determined from a color pair and its selection ordering, wherein the set of colors is displayed to a first user and a set of color selections is received from the first user which establish three color pairs (the first being a most liked and second most liked color pair, the second being a third and a fourth most liked color pair, the third being the most liked and the least liked color pair), receiving an answering player's selection of a chosen answer to each question and displaying an answering player's score, wherein the questions asked include at least one question based at least in part on each of the first and second color pairs, and the answering player's score is calculated based upon a comparison of each answer to the predicted answer and awarding a point total based upon a preselected criterion, and then calculating a total score for the answering player and a fortune is provided based upon a color pair personality profile.

19 Claims, 8 Drawing Sheets

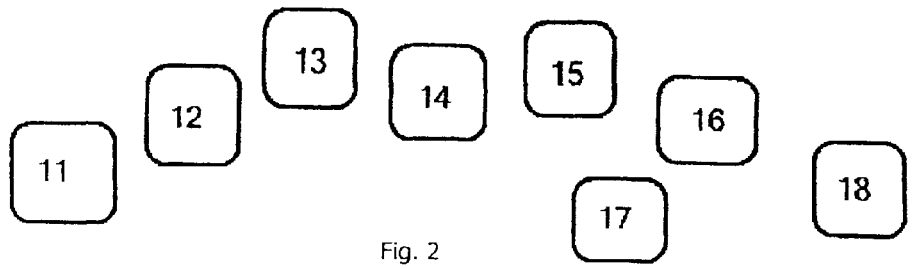
Fig. 2
Color Chart for
Drawing Sheets
Red 11
Black 12
Green 13
Brown 14
Yellow 15
Grey 16
Violet 17
Blue 18
Fig. 1
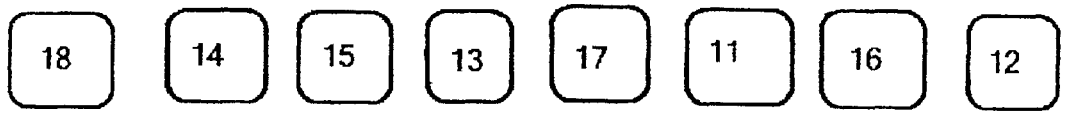
Fig. 3
Color Table for ColorFortunes Fig. 6, 7, 8, 9
|     | Mascot A | Mascot B | Mascot C | Mascot D |
| --- | --- | --- | --- | --- |
| 1st | 11, 18 | 13, 11 | 18, 15 | 15, 17 |
| 2nd | 13, 15 | 18, 17 | 12, 13 | 11, 16 |
| 3rd | 11, 12 | 13, 16 | 18, 14 | 15, 12 |
Fig. 4

SOCIAL NETWORKING METHODS USING COLOR PAIR PERSONALITY PROFILES

FIELD OF THE INVENTION

The invention is in the field of methods implemented in a computer system and, more specifically, in social networking methods that use color pair personality profiles.

BACKGROUND OF THE INVENTION

It is known that the selection of colors can provide insight into psychological preferences of a human being. This concept has been set forth in many publications by M. Luscher and has been described in a book entitled, "The Luscher Color Test." A translated version of this book, edited by Ian A. Scott, has been published by Random House, Inc. Library of Congress Catalog Card Number: 70-85562, the disclosure of which is specifically incorporated herein by reference.

In the past efforts have been made to use some of the concepts taught by Luscher in settings to explore relationships, such as U.S. Pat. Nos. 4,971,561, 4,682,956 and 4,815,976, all by the same inventor as the present invention.

The concepts taught by Luscher have also been used as a foundation for self help guides as disclosed in U.S. Pat. Nos. 6,863,534 and 6,893,265.

The present invention advances the state of the art that uses color personality traits and expands it into a social networking format where it can be used to promote and explore social networking, and provide features not presently available in social networking settings.

SUMMARY OF THE INVENTION

The present invention is generally directed to methods implemented in a computer system with one or more processors configured to execute one or more computer program modules in which one or more computer program modules configured to communicate with electronic storage media that stores a set of at least six colors and questions having multiple answers, one of which is a predicted answer, individual questions and their predicted answers being based at least in part on unique color pair personality profiles determined from a color pair and its selection ordering, wherein the set of colors is displayed to a first user and a set of color selections is received from the first user which establish three color pairs (the first being a most liked and second most liked color pair, the second being a third and a fourth most liked color pair, the third being the most liked and the least liked color pair), receiving an answering player's selection of a chosen answer to each question and displaying an answering player's score, wherein the questions asked include at least one question based at least in part on each of the first and second color pairs, and the answering player's score is calculated based upon a comparison of each answer to the predicted answer and awarding a point total based upon a preselected criterion, and then calculating a total score for the answering player.

In a first, separate group of aspects of the present invention, the first user and the answering player are the same, the first user's score is displayed on a social network with the set of color selections for a preselected period of time (and can replaced periodically with a new score associated with a new set of color selections), the first user is prompted to select a new set of color selections after a preselected period of time, and the first user is asked questions based at least in part on the unique color pair personality profile defined by the third color pair and given a playing option for each such question.

In a second, separate group of aspects of the present invention, the answering player is not the first user, the first user's set of color selections (and possibly the user's score) is displayed on a social network for a preselected period of time, and the answering player's score is displayed on the social network.

In a third, separate group of aspects of the present invention, two or more users proceed with the method at the same time. In this method, each user selects an individual set of color selections, one of the users is selected as the answering player, a question is asked tied to a color pair of the answering player, scores are awarded when scoring criteria are met and, if a stopping criteria is not triggered, the process is repeated (and, when appropriate, a different user can be selected as the answering player). The answering player can be given a playing option for each question based at least in part on the answering player's matching color pair personality profile for their third color pair and each of the users can be the answering player and receive the same number of questions as the other users based at least in part upon the player's first and second color pairs. Special rules can apply to questions based upon the third color pair, such as negative points for a wrong answer, or allowing an increased wager of points by the answering player. Color fortune points can be awarded for players whose color pair matches that of the answering player whereas non-matching players can be awarded path points and overall winners can be declared in total points and only in color points. Also, a non-matching player can receive a hint for the predicted answer to the given question. As was the case with a single user method, scores can be displayed on a social network and a third party can repeat the method and obtain a score (which can also be posted on the social network) when only one of the user's color selections is used.

In a fourth, separate group of aspects of the present invention, a fortune cookie is provided that contains a fortune based at least in part on one or more of the unique color pair personality profiles defined by at least one of the first and the second color pairs of either the answering player, the first user, multiple users or a third party.

Accordingly, it is a primary object of the present invention to provide improved social networking methods that use color pair personality profiles.

This and further objects and advantages will be apparent to those skilled in the art in connection with the drawings and the detailed description of the invention set forth below.

BRIEF DESCRIPTION OF THE DRAWINGS

FIG. 1 is a table of colors from the Luscher Color Test that are illustrated as being randomly displayed in FIG. 2 and then rearranged according to a user's initial color preferences and displayed in FIG. 3.

FIG. 4 illustrates a set of a first, second and a third color pair for each of four users based upon their selection of five colors from FIG. 3.

DETAILED DESCRIPTION OF THE INVENTION

Figure 5:
FIG. 5 illustrates an arrangement of eight mascots displayed on a screen.
Figure 6:
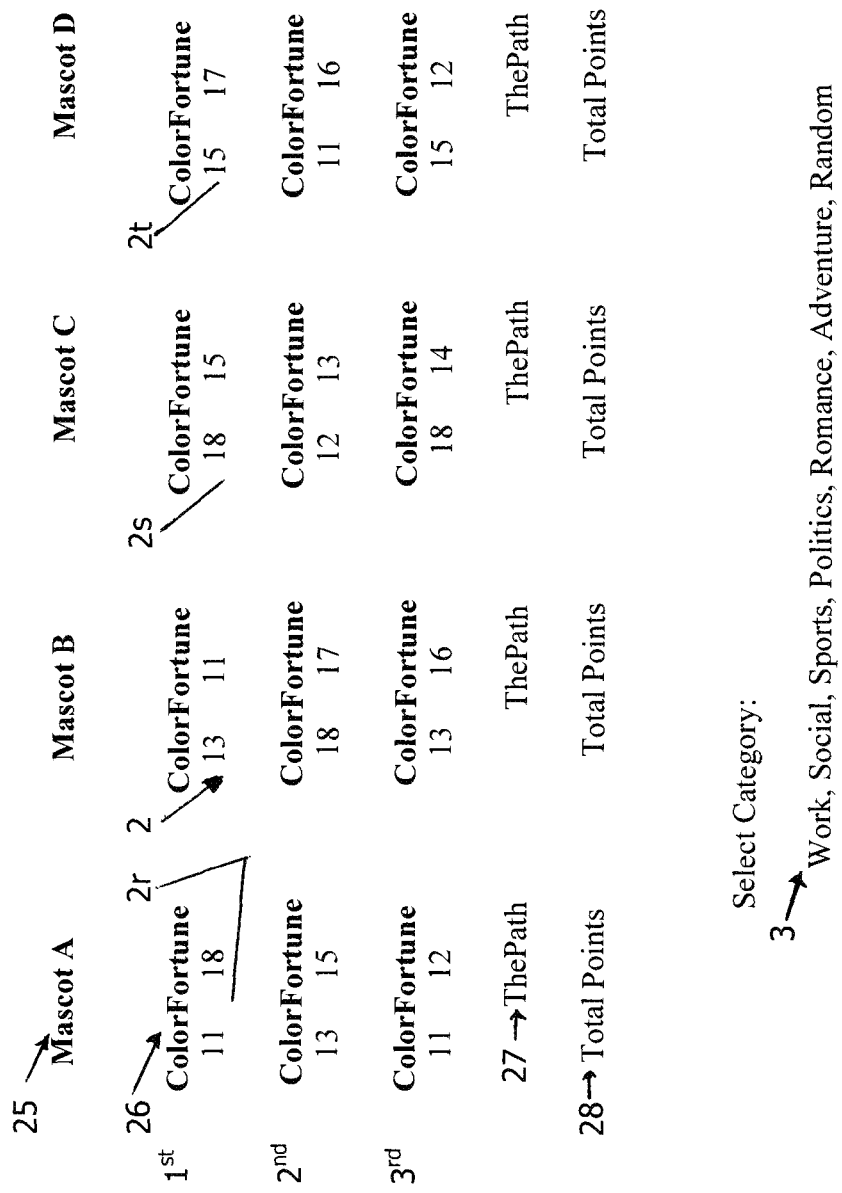
FIG. 6 illustrates the initial play screen with each Color-Fortune™ in two colors that match each color pair of each user.
Figure 7:
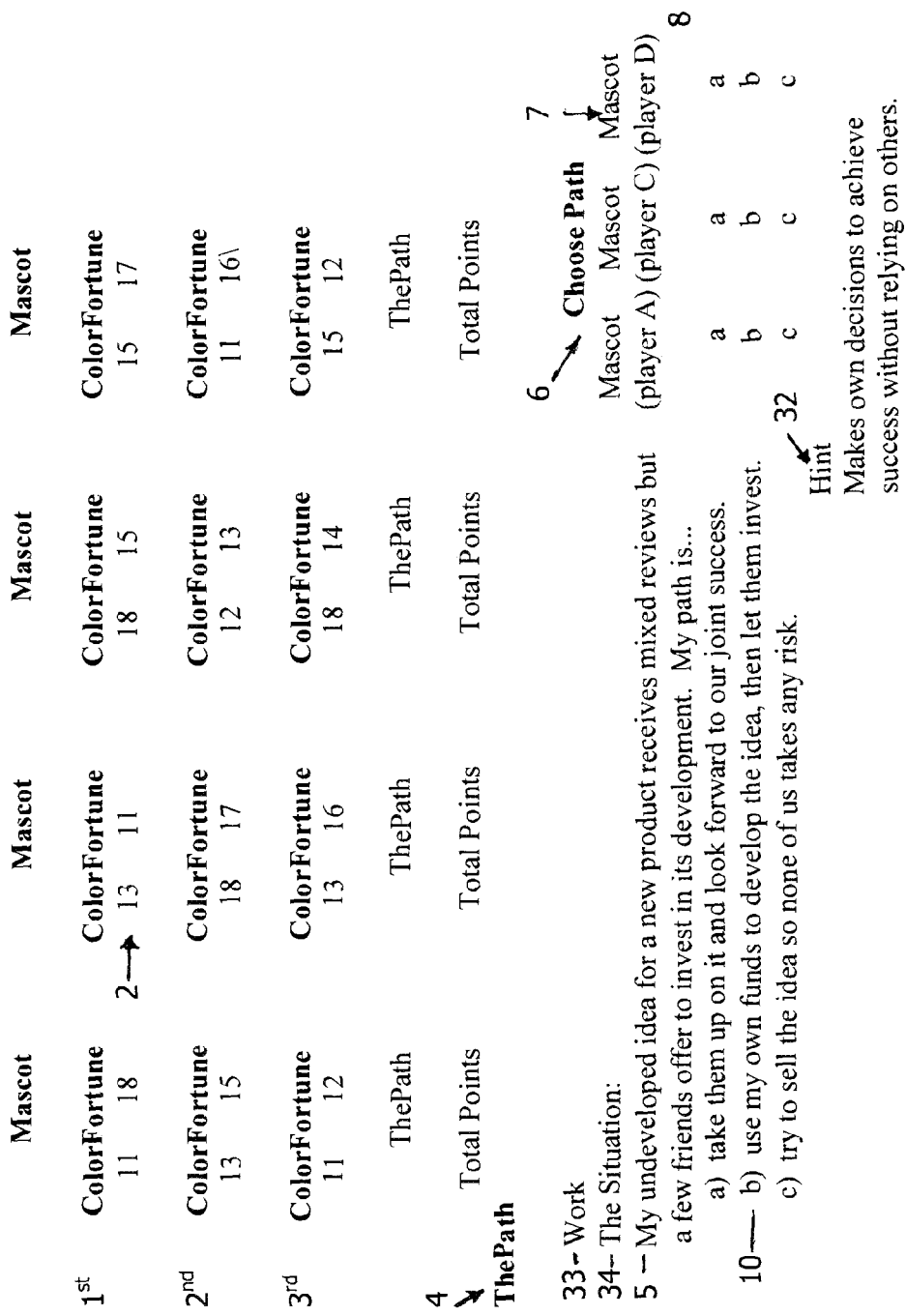
FIG. 7 illustrates the play screen displaying a question with multiple choice answers before users have been awarded a score.
Figure 8:
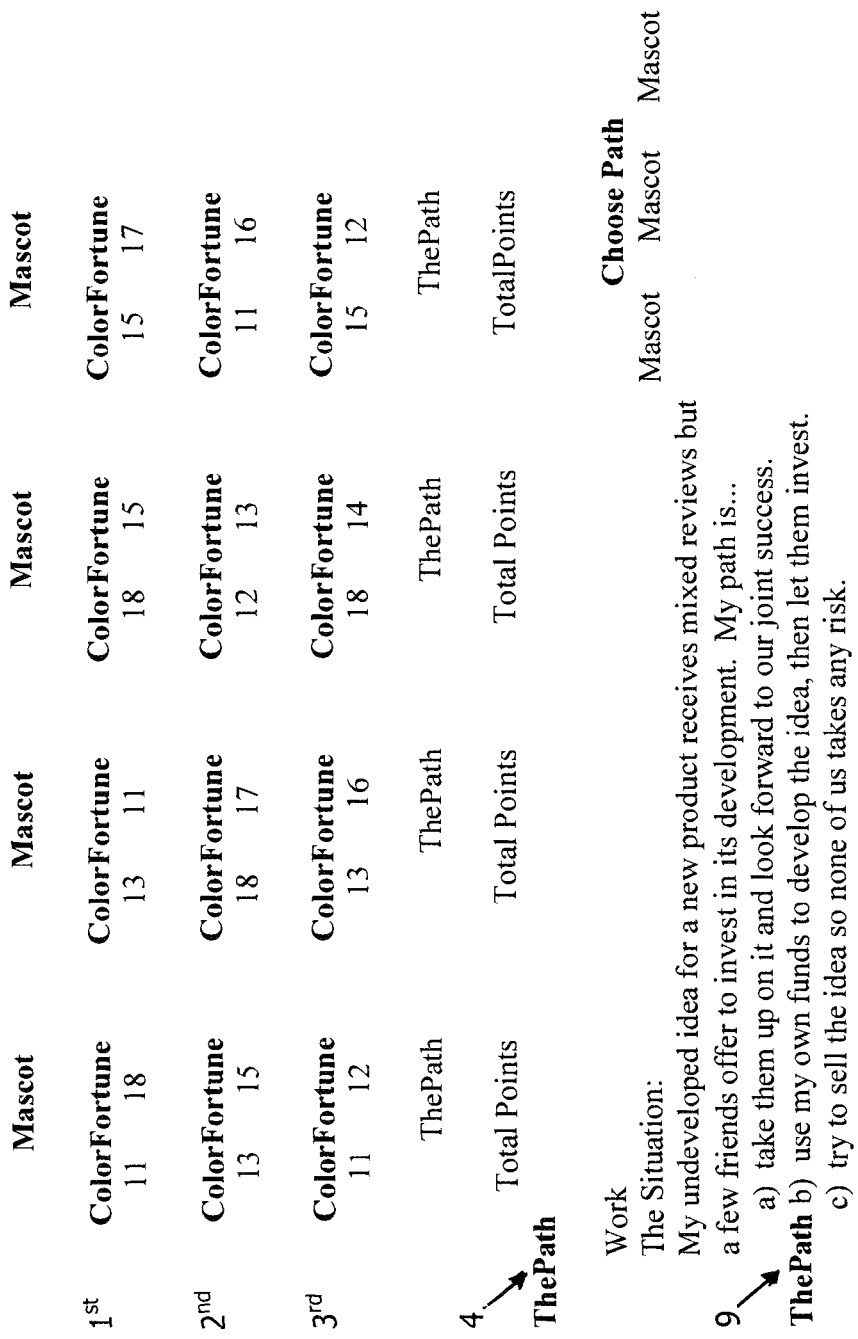
FIG. 8 illustrates the play screen with the predicted answer indicated.
Figure 9:
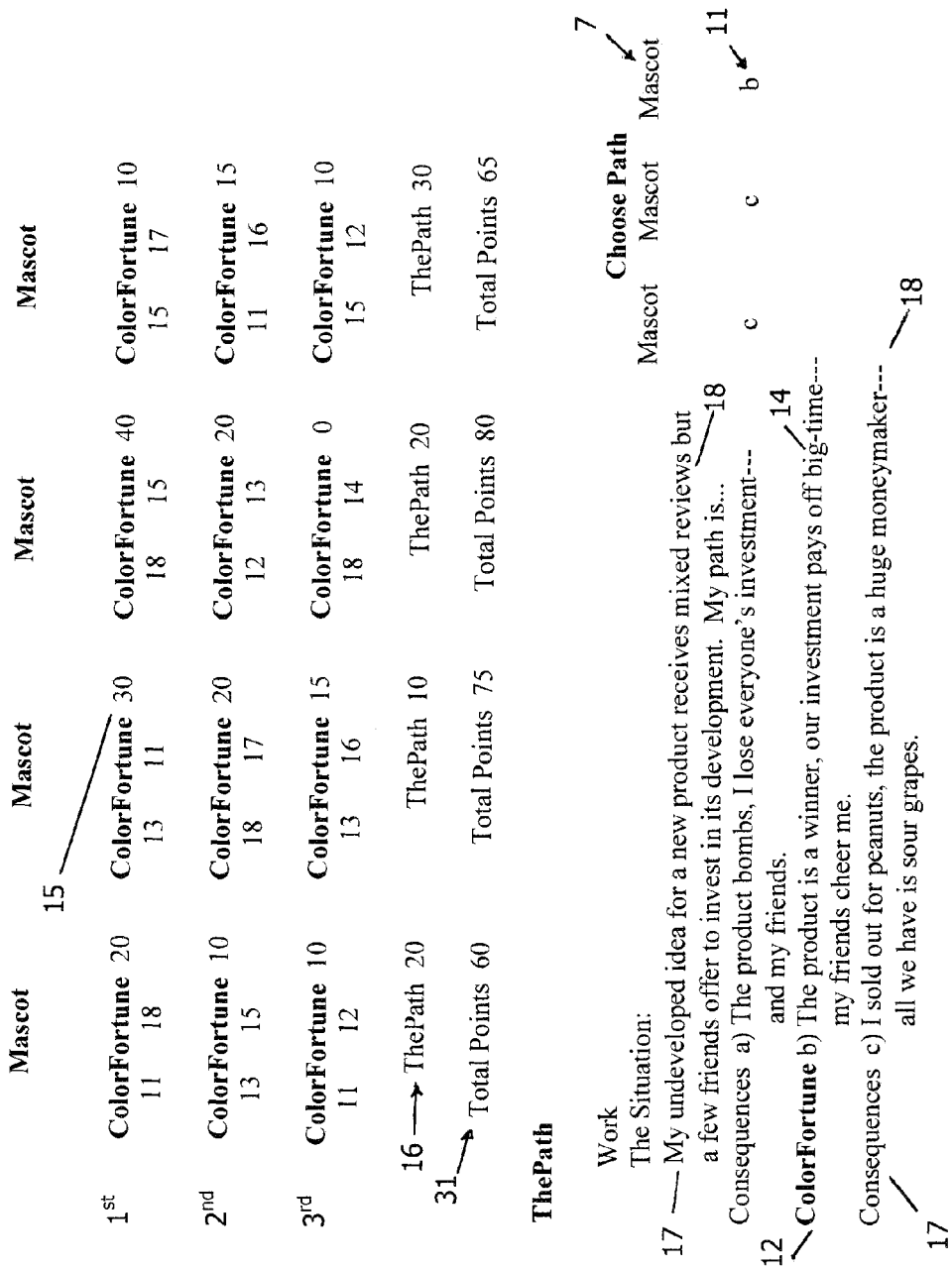
FIG. 9 illustrates the play screen displaying the results of each possible answer to the question and the awarded scores.
Figure 10:
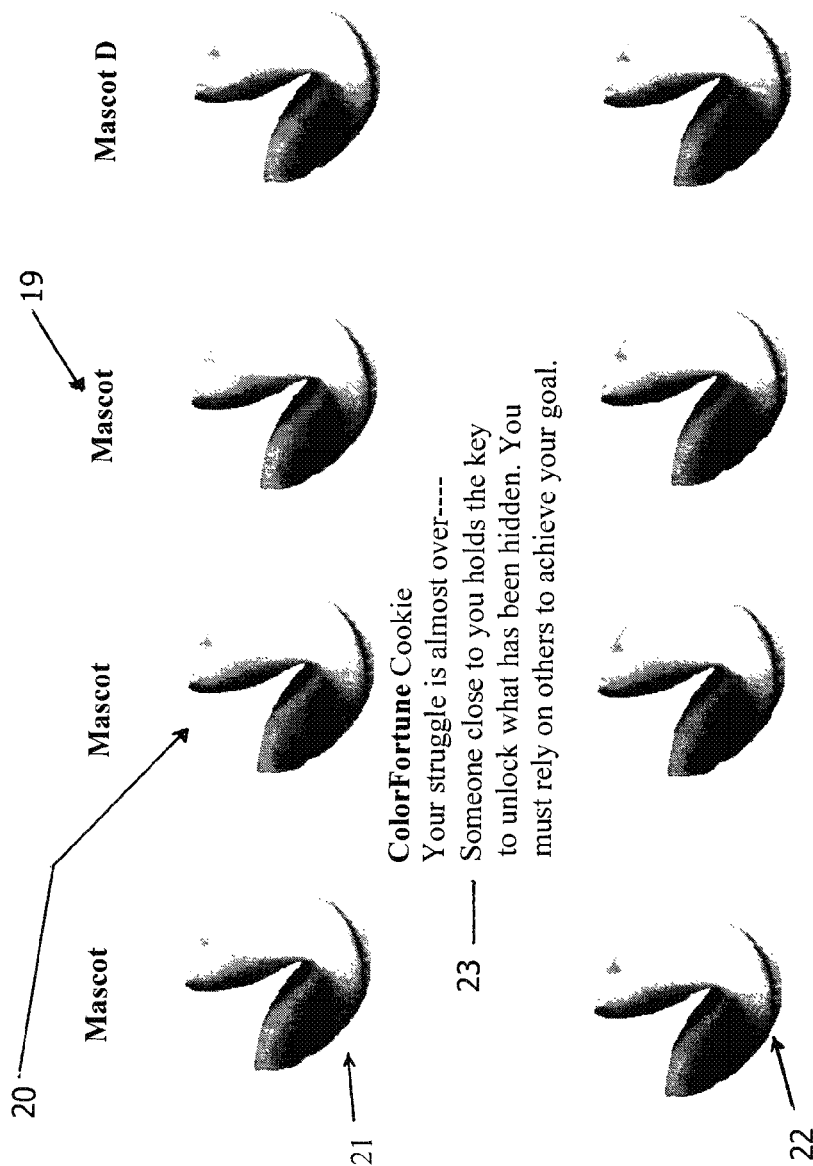
FIG. 10 illustrates a pair of fortune cookies provided to each of four players at the conclusion of a method according to a preferred embodiment of the invention.

At the present time social interaction through websites, or social networking, has become a widespread phenomenon. The website Facebook™ for example, according to Wikipedia™, is not yet even five years old, and it already has over 400 million active users worldwide. This website allows user to have an online profile, share pictures, e-mail friends and set up on-line chat and blogs. On a more limited basis, Twitter™ allows for social networking, but on a quicker and smaller scale, as the messages are limited to a relatively small number of characters.

In addition to social networking, the iPhone™ and other advances in cellular telephone have had a major impact on how persons today interact and stay connected with one another in the United States. Since its introduction, millions of users in the United States have become users of the iPhone™ and Apple™ has an application store where tens of thousands of applications, or more, are offered for use on iPhones™. Several notable features of the iPhone™ are helping to fuel this trend. The iPhone™ has a touchscreen that allows users to easily interact with the device and create a virtual keyboard in lieu of an actual keyboard. In addition, the iPhone™ is an Internet- and multimedia-enabled smartphone. As such, websites such as Facebook™ can easily be accessed and monitored on the go by use of an iPhone™.

While the iPhone™ has gained widespread popularity, competition has continued, and surely will continue, to move forward. For example, other telephone manufacturers and cell phone providers are promoting alternatives to the iPhone™ that offer Internet- and multimedia-enabled smartphones, and Google™ is itself trying to offer platforms and products to compete with the iPhone™. Also, even Apple™ itself has promoted a new product, the iPad™ which can be described as a tablet computer that will perform many of the functions of the iPhone™.

Accordingly, there has never been a time in history where it has been so easy for an individual to access the Internet and remain connected, if one chooses to do so, on a virtually unlimited basis. And, one suspects, the trend of social interaction and ready access via social networks will only continue to grow in the future.

Despite all of the present social networking and the ability to conduct social networking, there must still be a driver for why one engages in social networking activities. At the present time, messaging and sharing of multimedia applications, such as pictures and videos, are major drivers. However, one can only assume that additional drivers, if identified, will be highly valuable and desirable, as they will provide additional benefits in a trend that is surely changing the way human beings interact with each other.

The present invention recognizes the trend in social networking and proposes a new driver for social interaction. The new driver is the use of color pair personality profiles to drive social networking. This can be done in several different ways, which will be discussed in greater detail below.

First, however, it is worth noting that certain people like to read daily horoscopes or receive "fortunes" such as are found in fortune cookies. While some people may take these activities seriously, others treat them as a form of entertainment, and sometimes such items promote lively social discussion. Thus, there is human precedent for interaction based upon perceived predicted behavior, even if the methodology of such predicted behavior is not given credence. The present invention also recognizes this human behavior, but goes far further. If people enjoy daily horoscopes and fortunes, why not promote something that does have an established basis, so that its results are likely to be more relevant, and thus lead to more engaging interaction and enjoyment?

The present invention goes beyond horoscopes and fortunes by using color pair personality profiles in methods designed for use with social networks. In all of the methods of the present invention, questions and a predicted answer are based at least in part on a unique color pair personality profile determined by a unique color pair and a unique selection ordering. A unique color pair is a combination of two colors selected from a fixed set of colors. A unique selection ordering is based upon color preferences of the person making the selection of the color pair from the fixed set of colors. In the present invention three unique selection orderings are used. First, there is a color pair representing the most liked and the second most liked colors from the fixed set of colors. Second, there is a color pair representing the third most liked and the fourth most liked colors from the fixed set of colors. Third, there is a color pair representing the most liked color and the least liked color from the fixed set of colors. Each of these unique selection orderings, for each unique combination of colors, is associated with unique color pair personality profiles that help define each unique question and its associated possible answers used in the present invention. As a result of this methodology, the predicted answer should be the best fit for the question for an individual who has honestly chosen the unique color pair for the unique selection ordering if the question and predicted answer, and alternative answers, are properly prepared and based at least in part on the matching color pair personality profile, which is reasonably accurate. And, because the unique color pair may change depending upon a person's state of mind when the choice is made, and may in fact vary over time, the methods of the present invention provide an opportunity to provide an insight into the personality of a user based upon how that user is doing, and feeling, at a given point in time. Conversely, the methods of the present invention also provide a way to gauge facets of a user's personality, and changes in it, over time, and this opens up significant opportunities and applications in the field of social networking.

As noted in the background of the invention, it is known that the selection of colors can provide insight into psychological preferences of a human being as set forth in many publications by M. Luscher. In an especially preferred embodiment of the present invention, a fixed set of eight colors is used, and this set is the same as that described in the book The Luscher Color Test, and the color pair personality profiles that the questions are related to are the same as established by accepted research, such as that found in the book The Luscher Color Test. It should be noted that additional colors, or groups of colors can be used in the present invention, but there must be sufficient testing and validation of such colors, and the resultant color pair personality profiles, to ensure that the color pair personality profiles are reasonably accurate for a given color pair and its selection ordering from the set of colors. Thus, for example, one can not simply add a new color or colors to the set of eight colors used in the book The Luscher Color Test and expect the results to be the same without sufficient testing and evaluation to determine how inclusion of the new color affects color preferences.

As part of the methods of the present invention, one or more users must be shown a set of fixed colors and then the user(s) must select five colors to comprise three color pairs according to the user(s)' color preference at the time the selection is made (without regard for user(s)' color preferences in clothing, cars, etc.). Once this selection process is complete, the color pairs are stored in memory, and then they are later used in retrieving questions (and their associated possible answers) appropriate for a given color pair and a given selection ordering. There are three possible methods for asking the questions, with a further variation on the third method.

First, a first user can make the color selections and the first user can be an answering player who answers questions. This scenario has several possible uses. For example, the first user might want to perform the method to gauge how well that person is in touch with oneself at the time the method is employed. If a standard format for questioning is used, the result of the method can be a score that can be saved and compared to future scores for the same person. If such scores are displayed on a social network, they may form the basis for social interaction about how in touch that person is with herself/himself at a given point in time and may even promote commentary or dialog regarding the same. Also, by recording historical scores, trends may be observed, forming further basis for social interaction or self introspection. This scenario may also be especially useful for providing information about persons in the public spotlight, such as entertainers, athletes, and the like. By posting the color selections of such persons and, optionally, their scores, other persons can gauge the public person's personality at a temporal moment in time (relative to the timing of the color selections) and even try to assess how a celebrity might respond to certain questions at a given point in time.

Second, the first user who makes the color selections and the answering player can be different. This scenario allows persons to evaluate how well they may know friends or acquaintances, or celebrities (as just noted). If the score of the answering player is displayed on a social network, it can allow multiple persons to compare how well they predict the scores of friends. In such a scenario, imagine that a friend's color selections are posted on a social network such as Facebook™ and then other friends can access the color selections, perform the method, and then post their scores. This can prove to be a form of entertainment (e.g., who can beat the friend's score, who can most accurately predict the friend's expected behavior today, etc.) and also be a mechanism for promoting social interaction. If this scenario is applied to a celebrity, one can imagine a fan club type of situation about who best knows the celebrity today or can best predict the celebrity's behavior today, and the like, or it may just be a way to learn more information about the celebrity (after all, there is a great demand for all sorts of information about public persons today).

Third, multiple users can make color selections and then one or each of them can take turns being the answering player. In this type of scenario, which is more akin to a game format, a point winner can be declared at the end of the method, and scores can be posted on a social network. One can imagine a group of people performing the method on a regular basis to see who will be the point winner on a given day, or given point of time. Also, in a variant on this method, additional third persons can come along later, participate in a method that is really a hybrid of the first two methods, and then have their score posted as an additional score with respect to the multiple users. Thus, for example, assume that a group has ten members, but only five are available to participate in the method at a given point in time. Using this hybrid method, the other five members could participate in the method at a later time, relying upon saved color selections and question choices for when the method was originally performed, answer their own questions, and receive a score that can then be posted and compared to the other scores.

Accordingly, it will be seen that the present invention affords a number of methods useful for promoting social interaction that can be entertaining and enjoyable for many different types of users.

The present invention will now be described further in the context of how the method is actually performed when only a single person is answering questions (whether or not the answering player is the first user who makes the color selections), the method can be performed with any number of ways to terminate the method.

The length and timing of the method can be decided in a number of ways. For example, there may be a fixed number of questions that are asked, or there may be a fixed time limit, or the method may continue until a certain point total is achieved.

The scoring can take on a variety of forms, depending upon whether or not the answering player is the first user who makes the color selections.

If the answering player is the first user, a positive score can be awarded each time the answering player's answer correctly matches the predicted answer for the question. In an especially preferred embodiment, a single point score is awarded whenever the question asked is based at least on part on the unique color pair personality profile defined by either the first color pair or the second color pair. Questions tied to the first color pair will generally be related to desired objectives or behavior dictated by desired objectives (i.e., future events) and questions tied to the second color pair will generally be related to the existing situation (i.e., present events), but questions tied to the third color pair will generally be related to actual problems or behavior resulting from stress. In one preferred embodiment of the present invention, an answering player has the option of choosing not to answer questions tied to the third color pair, or, in effect, allowing extra points to be wagered on such a question, with a non-matching answer resulting in a negative score for the amount wagered on the question. This latter variation lends itself to more unpredictability and a certain chance factor, and this can help keep the method fresh when it is performed over and over, even with the same color selections.

If the answering player is not the first user, points can be awarded when the answering player's answer matches the predicted answer or the same points (or a different amount of points) can be awarded when the answering player's answer matches a saved answer of the first user to the same question for the same color selections. In this situation, the answering player may or may not be allowed to answer questions tied to the third color pair and, in an especially preferred embodiment, no negative points are awarded for failure to match an answer tied to the third color pair unless the answering player has also selected the same third color pair as the answering player's own third color pair. If the answering player is required to make his or her own selection of color pairs, the scoring can be adjusted to make it similar to that for when the answering player is the first user when both the first user and the answering player having matching color pairs. Also, when the answering player does not have a matching color pair with the first user, the answering player may be allowed to access a hint tied to the color pair personality profile associated with the color pair for the question where the answering party's color pair does not match that of the first user.

After the answering player is finished with the method (whether or not the answering player is the first user who makes the color selections), the answering player, in an especially preferred embodiment, receives a "fortune cookie" that contains a fortune based at least in part on the unique color pair personality defined by the first or the second color pairs. The "fortune cookie" can, if desired, appear in the shape of a computer generated fortune cookie that opens to reveal a fortune message, but this is not required—in other words, the "fortune cookie" is any method or device by which the fortune is provided. Because the fortune is based at least in part on a unique color pair personality profile, it has a psychological basis, unlike a common fortune cookie fortune or a horoscope prediction. The fortunes can be generated in advance of performing the method and they may or may not be tied to topics raised by questions asked during performance of the method. When the answering player is not the first user who makes the color selections, the fortune provides an insight to that of the first user, which can make the exercise enjoyable for answering players, especially if the first user is a public person. In an optional embodiment, when the answering player is not the first user who makes the color selections, the answering player can also be provided with a fortune based upon color selections provided by the answering player, thus giving the answering player a sense of personal ownership and involvement with the fortune.

The present invention will now be described further in the context of an especially preferred embodiment of how the method can be implemented when multiple users are answering questions. In connection with this preferred embodiment, a system of rules and play will be described and displays used in this preferred embodiment will be illustrated in FIGS. 1-10. For purposes of illustration only, the following description will assume that four users are involved in the method at the same time. It should be noted that the four players could all be present in a single location using a single electronic device, or multiple electronic devices (e.g., multiple smart cellphones), or multiple locations.

The method begins by displaying the set of eight colors (numbered 11-18) on a color display screen (represented in FIG. 2 with the color table being in FIG. 1, said color table being based upon the colors used in the book The Luscher Color Test described in the Background of the Invention) to each of the users and allowing each user to choose that user's own color preferences at the moment to end up with a reordered set of colors, as illustrated in FIG. 3. The user then selects five colors (without regard for user's color preferences in clothing, cars, etc.) from most liked to least liked to establish three color pairs (the first being a most liked and a second most liked color pair, the second being a third and a fourth most liked color pair, the third being the most liked and the least liked color pair). The set of colors, when they are first displayed, are preferably oriented in a random fashion and the selection of colors can be made through touch selection in electronic devices having such capability (e.g., the iPhone™), through computer mouse selection, or through other means of selection. Each user will also select a unique mascot or marker (numbered 1-8 in FIG. 5). The color pairs and marker for each user are stored in memory.

Each of the users who is an answering player having the turn ("P") reads a narrative situation, i.e., a question, (in a category chosen by P) based on one of his or her ColorFortunes, i.e., color pairs, together with three different paths, i.e., answers, that may be taken. Other players each read the situation and secretly choose the path they believe P will choose. If P chooses the path that matches his or her color data, ThePath, i.e., the predicted answer, P wins points and receives the good result of his/her choice. If P chooses one of the other two paths P receives the bad result of his/her choice. Other players win points if they choose the predicted answer or choose the same answer as P. There are two winners at the conclusion of a complete round of the method: a) the player who wins a set total of points, or wins the highest number of points within a set time period; and b) the player who has the highest total ColorFortunes points.

In accordance with this especially preferred embodiment of the present invention, which can be set up in the fashion of a ColorFortune™ game, several objects can be stated for playing the game (method). First, to see how well you know your state of mind. Second, to see how well you know the state of mind of others. Third, to see how changes in states of mind affect decisions. Fourth, the score shows each player "who knows you better—you or your friends."

When the game is setup initially, players can have a choice of solo mode or against other players. The players involved in the setup can select points for each turn, e.g., 10, and total points needed to win, e.g., 150, or select a time period, e.g., 30 minutes, for each game.

The method begins by displaying the set of eight colors (numbered 11-18) on a color display screen (represented in FIG. 2 with the color table being in FIG. 1, said color table being based upon the colors used in the book The Luscher Color Test described in the Background of the Invention) to each of the users and allowing each user to choose that user's own color preferences at the moment to end up with a reordered set of colors, as illustrated in FIG. 3. The user then selects five colors (without regard for user's color preferences in clothing, cars, etc.) from most liked to least liked to establish three color pairs (the first being a most liked and a second most liked color pair, the second being a third and a fourth most liked color pair, the third being the most liked and the least liked color pair). The set of colors, when they are first displayed, are preferably oriented in a random fashion and the selection of colors can be made through touch selection in electronic devices having such capability (e.g., the iPhone™). Each user will also select a unique mascot or marker (numbered 1-8 in FIG. 5). The color pairs and marker for each user are stored in memory. Each color pair reflects a state of mind associated with a color pair personality profile. Color choices may change from game-to-game. Features may be selected before each game: a) Penalty Points—player loses points for not choosing the predicted answer (see below); and/or b) 3rd ColorFortune option (see below); and/or c) Hint—each player receives a hint before choosing a path (see below.)

Each player's mascot (25, FIG. 6) and "ColorFortunes" (26, FIG. 6) appear, i.e., 1st ColorFortune: "Color"=best-liked color, "Fortune"=2nd best-liked color; 2nd ColorFortune=3rd & 4th best-liked colors; 3rd ColorFortune=best-liked color and color liked least. "ThePath" (27, FIG. 6) and "Total Points" (28, FIG. 6) appear for each player. Play rotates from each player's 1st ColorFortune ("CF") to 2nd CF to 3rd CF for each time player has the turn.

The play will now be described in a series of rules steps.

1. Player having the turn ("P") selects his/her mascot which lights up. His/her current ColorFortune (2, FIG. 6) lights up. Current ColorFortunes of other players (2r, 2s, 2t, FIG. 6) are all 1st CFs (all players have current 1st CFs or 2nd CFs or 3rd CFs). P then chooses 1 of 6 situation, i.e., question, categories (3, FIG. 6) that appear, e.g., work, social, sports, politics, romance, adventure, or random. Category chosen (33, FIG. 7)

appears above "The Situation" (34, FIG. 7); other categories disappear. "ThePath" (4, FIG. 7) appears; "The" is 1st color, "Path" is 2nd color, of his/her current ColorFortune (2, FIG. 7).

2. A situation, i.e., question, (5, FIG. 7) appears with paths a, b, and c (10, FIG. 7); "Choose Path" (6, FIG. 7) appears, other players' mascots (7, FIG. 7) appear with "a," "b," "c" (8, FIG. 7) listed under each. For same device game, P reads aloud the situation and three paths, i.e., answers.

3. Other players each read the situation and paths, select their mascot (7, FIG. 7) and secretly choose a, b, or c under their mascot—the one they believe P will choose; a, b, c's disappear. "ThePath" (4, FIG. 7) lights up.

4. For same device game, P reads aloud his/her choice of path a, b, or c (10, FIG. 7).

5. P selects "ThePath" (4, FIG. 8)); "ThePath", indicating the predicted answer, (9, FIG. 8) (same colors as P's current CF) appears next to path a, path b, or path c. For online or peer-to-peer game, "ThePath" appears next to path a, b, or c on other players' screens, but not on P's screen until after #6. (P must choose path a, b, or c before knowing which is ThePath, i.e., the predicted answer.)

6. P chooses path a, b, or c (same path as in #4). Other players' choice of a, b, or c (11, FIG. 9) appear under their mascot (7, FIG. 9).

7. If P's choice of a, b, or c is the predicted answer, "ColorFortune" (same colors as P's current CF) (12, FIG. 9) appears instead of "ThePath" and the good result of P's choice (14, FIG. 9) appears instead of the path he/she chose. P wins points for his/her current ColorFortune (15, FIG. 9). Other players who chose the predicted answer win points for their ThePath (16, FIG. 9). However, if P's current ColorFortune matches another player's current ColorFortune that "color match" player wins points for his/her current ColorFortune instead of for his ThePath. Total Points (31, FIG. 9) is the sum of 1st, 2nd, and 3rd ColorFortune points, and ThePath points, for each player.

8. If P did not choose the predicted answer, "Consequences" (black color) (17, FIG. 9) appears next to the path he/she chose and the bad result of P's choice (18, FIG. 9) appears instead of the path he/she chose. Other players who chose the same answer as P win points for their ThePath; however, "color match" players do not win points. If Penalty Points was selected before game starts, P loses points from his/her current ColorFortune (15, FIG. 9); and "color match" players who did not choose the predicted answer lose points from their current ColorFortune.

9. When each game ends, the 1st winner's mascot flashes and his/her total points flash; 2nd winner's 3 ColorFortunes and ColorFortune points flash. The same player may be the 1st winner and the 2nd winner. The 1st winner selects his/her mascot (19, FIG. 10); screen clears, only each player's mascot (20, FIG. 10) remains.

10. Two ColorFortune™ Cookies appear under each player's mascot (20, FIG. 10)), one for 1st ColorFortune (21, FIG. 10) and one for 2nd ColorFortune (22, FIG. 10). Cookies break open one by one; a ColorFortune™ (with each player's matching colors) inside each unfolds, revealing each player's fortune (23, FIG. 10) based at least in part on his/her color pair personality profile.

The turn passes. The mascot for new P lights up—screen clears, play screen (FIG. 6) appears.

For same device game: during play the players discuss the situations, paths, their choices and results, and their ColorFortunes™.

For peer-to-peer or online/network game: during play the players may be able to instant message or text each other re the situations, paths, their choices and results, and their ColorFortunes™.

Additional ColorFortune™ play:

1. The color liked least adds a stressful tone to the 3rd ColorFortune. Situations are more complex, and choosing ThePath, i.e., the predicted answer, is more difficult. This feature may be selected before game starts: after P wins a turn and reads the good result of his/her choice, P can have option of selecting his/her 3rd ColorFortune and winning or losing more than the usual points. Other players win or lose points as in 7, 8. above. If P does not select this option, the turn passes. If this feature is selected, only 1st ColorFortunes and 2nd ColorFortunes rotate to be the current CFs for each player's turn. If this feature is not selected, the 1st, 2nd, and 3rd CFs rotate to be the current CFs.

2. If the Hint feature is selected before start of game: after reading situation, each player secretly reads the meaning of P's current ColorFortune prior to choosing a, b, or c. Said Hint (32, FIG. 7) appears when each player selects his/her mascot (7, FIG. 7) over a, b, c (8, FIG. 7). Said meaning disappears when each player chooses a, b, or c. The color preference data in The Luscher Color Test© will be rewritten to convey the meaning of each of the 56 1st color pair personality profiles, each of the 56 2nd color pair personality profiles, and each of the 56 3rd color pair personality profiles for this Hint feature. P cannot access said meaning, as his/her mascot does not appear over a, b, c's. Said hint does not appear when a "color match" player selects his/her mascot over a, b, c's. The hint will facilitate more interesting play between players who are acquaintances or do not know each other.

3. Before his situation appears, P can have option to win, or lose, more than the usual points.

4. Solo play, i.e., 1 player, can have two options:
   a) To see how well you know yourself—your state of mind, your decisions.
   b) To see how well you know another person—their state of mind, their changes in states of mind. For social networking sites, e.g., Facebook, MySpace: a person can choose their colors and post their 3 ColorFortunes on their site. Friends can use these ColorFortunes to play solo (on their device or online) to see how well they know the person, and to learn about the person and their state of mind. A person can choose different colors, and post different ColorFortunes from day-to-day as their state of mind changes.

Figure 11:
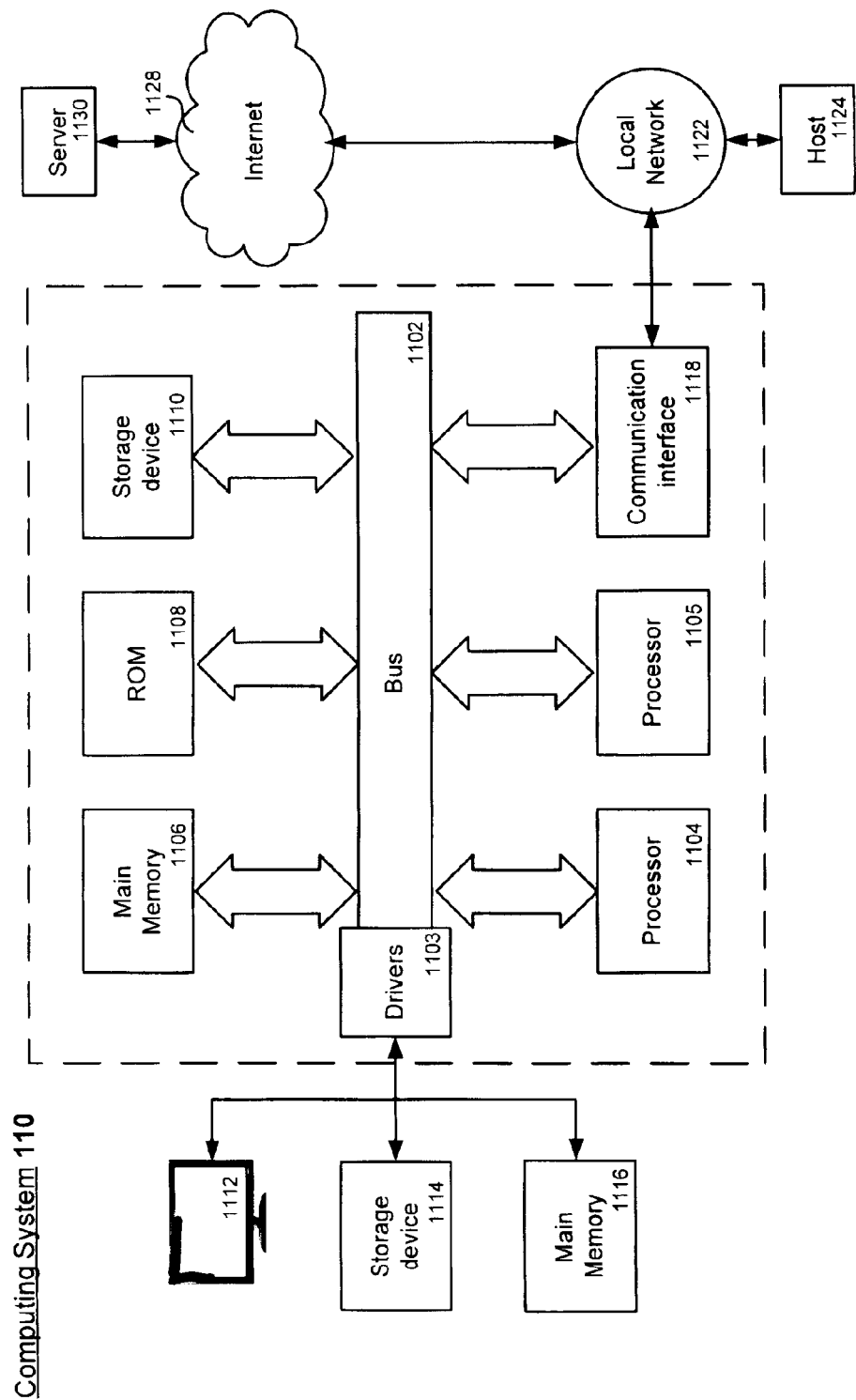
FIG. 11 is a simplified block schematic illustrating a processing system employed in certain embodiments of the invention.

The present invention will now be described in further detail by reference to FIG. 11. With reference to FIG. 11, certain methods of the invention can be implemented through use of a computer or a computer network and certain embodiments of the invention employ a processing system that includes at least one computing system 110 deployed to perform certain of the steps described above. Computing system 110 can comprise a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system. For example, a computing system might comprise a bus 1102 and/or other mechanisms for communicating between processors, whether those processors are integral to the computing system 110 or located in different, perhaps physically separated subsystems, and device drivers 1103 may provide output signals used to control internal and external components.

A computing system 110 suitable for use in the present invention typically comprises memory 1106, 1116 that may include one or more of random access memory ("RAM"), static memory, cache, flash memory and any other suitable type of storage device that can be coupled to a bus 1102 or other communication mechanism. In some embodiments, memory 1106 and one or more processors 1104, 1105 may be fabricated in a common device and/or collocated in a common package. Memory 1106, 1116 can be used for storing instructions and data that can cause one or more of processors 1104 and/or 1105 to perform a desired process. Main memory 1106 may be used for storing transient and/or temporary data such as variables and intermediate information generated and/or used during execution of the instructions by processor. Some computing systems 110 may comprise one or more separate non-volatile storage device 1114, such as read only memory ("ROM"), flash memory, memory cards or the like; non-volatile storage 1114 may be connected to the bus 1102 or other communication mechanism, but may equally be connected using a high-speed universal serial bus (USB), Firewire or other such bus that is coupled to the bus 1102 or other communication mechanism. Non-volatile storage 1108 can be used for storing configuration, and other information, including instructions executed by processors 1104 and/or 1105. Non-volatile storage may also include a mass storage device 1110, such as a magnetic disk, optical disk, and/or flash disk that may be directly or indirectly, temporarily or semi-permanently coupled to the bus 1102 or other communication mechanism and used for storing instructions to be executed by processors 1104 and/or 1105, as well as other information.

Computing system 110 may provide an output for a display system 1112, typically in a control panel. In some embodiments, display system may comprise one or more of an LCD flat panel display, a touch panel display, electroluminescent display, plasma display or other display device that can be configured and adapted to receive and display information to a user of the computing system. Typically, device drivers 1103 can include a display driver, graphics adapter and/or other modules that maintain a digital representation of a display and convert the digital representation to a signal for driving a display system 1112. The computing system 110 may also include logic and software to generate a display signal provided to a remote terminal or different computing system. An input device can be provided locally or through a remote system. It will be appreciated that input and output can be provided from and to a wireless device such as a smart cellphone, a PDA, a tablet computer or other system suitable equipped to display the images and provide user input.

Certain embodiments of the invention are especially suited for use with a smartphone such as the iPhone™. In such embodiments, for example, instructions may be stored in main memory 1106, having been received from a download made over the Internet, whereas computers might receive such instructions from a computer-readable medium such as a storage device 1114. Execution of the sequences of instructions contained in the main memory 1106 causes one or more processors 1104 and/or 1105 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to a processor, particularly where the instructions are to be executed by a processor and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to a processor or remotely, typically by use of network connection. Non-volatile storage may be removable from computing system, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of a computing system. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by a processor. For example, the instructions may initially be retrieved from a magnetic disk of a remote computer and transmitted over a network or modem to a computing system. The instructions may optionally be stored in a different storage or a different part of storage prior to or during execution.

A computing system may include a communication interface 1118 that provides two-way data communication over a network that can include a local network 1122, a wide area network or some combination of the two. For example, an integrated services digital network (ISDN) may used in combination with a local area network (LAN). In another example, a LAN may include a wireless link. A network link typically provides data communication through one or more networks to other data devices. For example, a network link may provide a connection through a local network to a host computer 1124 or to a wide are network such as the Internet 1128. A local network and the Internet may both use electrical, electromagnetic or optical signals that carry digital data streams.

A computing system can use one or more networks to send messages and data, including program code and other information. In the Internet example, a server 1130 might transmit a requested code for an application program through the Internet and may receive in response a downloaded application that provides for the anatomical delineation described in the examples above. The received code may be executed by a processor.

While the invention has been described herein with reference to certain preferred embodiments, those embodiments have been presented by way of example only, and not to limit the scope of the invention. Additional embodiments thereof will be obvious to those skilled in the art having the benefit of this detailed description. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A method implemented in a computer system comprising one or more processors configured to execute one or more computer program modules, the method comprising:

executing, on the one or more processors of the computer system, one or more computer program modules configured to communicate with electronic storage media that stores (1) a set of at least six colors that can form a predetermined set of unique color pairs, said stored set of unique color pairs is associated with a predetermined set of color pair personality profiles having a unique color pair personality profile associated with each unique color pair for a unique selection ordering; and (2) a plurality of questions, each of the plurality of questions representing a given question having a plurality of answers and one of said plurality of answers being a predicted answer, said given question and said predicted answer being based at least in part on one of the unique color pair personality profiles in the predetermined set of color pair personality profiles;

displaying to two or more users the set of at least six colors;

receiving from each of the two or more users an individual user set of color selections that represent a first color pair, a second color pair, and a third color pair from the set of at least six colors, the first color pair representing a most liked color and a second most liked color from the set of at least six colors, the second color pair representing a third most liked color and a fourth most liked color from the set of at least six colors, and a third color pair representing said most liked color and a least liked color from the set of at least six colors;

(a) selecting one of the two or more users as an answering player;

(b) receiving a chosen answer from each of the two or more users to a given question for a given color pair of the answering player;

(c) awarding a score to each of the two or more users whose chosen answer matches a preselected scoring criteria involving the predicted answer for the given question; and (d) if one or more stopping criteria have not been triggered by steps (a) through (c), repeating steps (a) through (c) until one or more stopping criteria is triggered;

wherein each of the two or more users is the answering player before the one or more stopping criteria is triggered;

wherein each of the two or more users is asked at least one question based at least in part on said each user's matching color pair personality profile for their first color pair and at least one question based at least in part on said each user's matching color pair personality profile for their second color pair; and wherein if the answering player's chosen answer matches the predicted answer in step (c), the answering player is given the option of proceeding with the following step before steps (a) through (c) are repeated in step (d):

answering an optional question based at least in part on the answering player's matching color pair personality profile for their third color pair and, if their answer to the optional question matches the predicted answer awarding an optional point score to the answering player.

2. The method of claim 1, wherein after step (d) is completed, each of the two or more users is provided with a fortune cookie that contains a fortune based at least in part on one or more of the unique color pair personality profiles defined by at least one of the first and the second color pairs chosen by said each of the two or more users.

3. The method of claim 1, wherein only a chosen one of the two or more users is selected as the answering player.

4. The method of claim 3, wherein the score of the chosen one of the two or more users is displayed on a social network for a preselected period of time.

5. The method of claim 4, wherein the score of each of the two or more users is displayed on the social network.

6. The method of claim 4, further comprising:

repeating steps (a) through (d) for a third party not included in the two or more users and comparing the resultant score for the third party with the score of the chosen one of the two or more users.

7. The method of claim 6, wherein the score of the third party is displayed on the social network.

8. The method of claim 6, further comprising providing the third party with a fortune cookie that contains a fortune based at least in part on one or more of the unique color pair personality profiles defined by at least one of the first and the second color pairs chosen by the third party.

9. The method of claim 1, wherein the answering player is given a playing option for each of the one or more questions based at least in part on the answering player's matching color pair personality profile for their third color pair.

10. The method of claim 1, wherein each of the two or more users is asked at least one question based at least in part on said each user's matching color pair personality profile for their third color pair.

11. The method of claim 10, wherein the answering player is given a playing option for each of the one or more questions based at least in part on said answering player's matching color pair personality profile for their third color pair.

12. The method of claim 1, wherein the optional point score awarded to the answering player is negative if the optional answer does not match the predicted answer for the optional question.

13. The method of claim 1, wherein each of the two or more users is given an option of receiving a hint for the predicted answer to the given question when the color pair of said each of the two or more users does not match the given color pair associated with the given question.

14. The method of claim 1, wherein the score is a color fortune point score if (i) the chosen answer is of one of the two or more users that is not the answering player and (ii) the color pair of said one of the two or more users does not match the given color pair associated with the given question.

15. The method of claim 14, wherein the score is the color fortune point score if (i) the chosen answer is of one of the two or more users that is not the answering player, and (ii) the color pair of said one of the two or more users matches the given color pair associated with the given question.

16. The method of claim 14, wherein a negative color fortune point score is awarded to any of the two or more users whose chosen answer does not match the predicted answer when said any of the two or more user's color pair matches the given color pair associated with the given question.

17. The method of claim 16, further comprising declaring a total point winner from the two or more users, said total point winner having the highest score based upon an addition of the total point winner's color fortune point score and path point score.

18. The method of claim 17, further comprising declaring a color fortune point score winner from the two or more users, said color fortune point score winner having the highest color fortune point score.

19. The method of claim 1, further comprising, after steps (a) and before step (c), receiving a category of questions response from the answering player and choosing the given question from said category of questions.

* * * * *